(No Model.)

W. C. ALLEN.
CUTTER BAR FOR LAWN MOWERS.

No. 545,934. Patented Sept. 10, 1895.

WITNESSES.
E. C. Smith
Matthew M. Blunt

INVENTOR.
William C. Allen
by N. H. Reeves ATT'Y

UNITED STATES PATENT OFFICE.

WILLIAM C. ALLEN, OF CAMBRIDGE, NEW YORK.

CUTTER-BAR FOR LAWN-MOWERS.

SPECIFICATION forming part of Letters Patent No. 545,934, dated September 10, 1895.

Application filed October 12, 1892. Serial No. 448,620. (No model.)

*To all whom it may concern:*

Be it known that I, WILLIAM C. ALLEN, of Cambridge, in the county of Washington and State of New York, have invented a new and useful Improvement in Cutter-Bars for Lawn-Mowers, of which the following, taken in connection with the accompanying drawings, is a specification.

My improvement relates to that part of a lawn-mower termed the "fixed" or "stationary" cutter, against which the grass being cut is pressed by the rotary cutters and the forward motion of the machine.

My invention consists in a flat steel cutter-bar serrated on its front edge by alternate teeth and notches extending obliquely backward from the upper to the lower surface of such edge, such bar having a longitudinal groove in its flat upper surface extending from end to end along the bases of said teeth to avoid friction of the revolving cutters on the bar behind the teeth, and each tooth is preferably recessed in its upper surface for a similar purpose. Each tooth also has its upper surface beveled forwardly and downwardly substantially parallel with the curved path of the rotary cutters.

My improved cutter-bar is to be distinguished from those heretofore known formed by turning up obliquely and corrugating by dies the edge of a thin steel strip.

Figure 1:
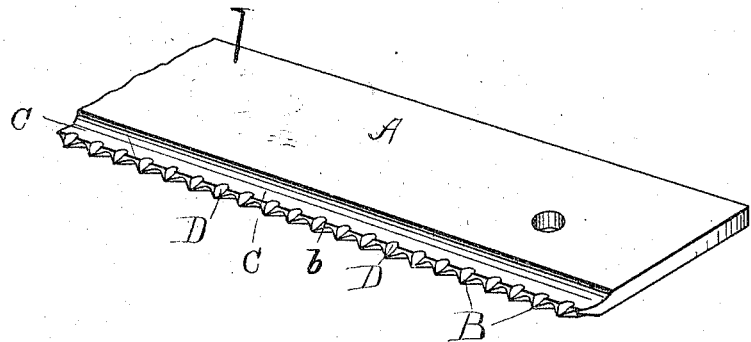
Figure 2:
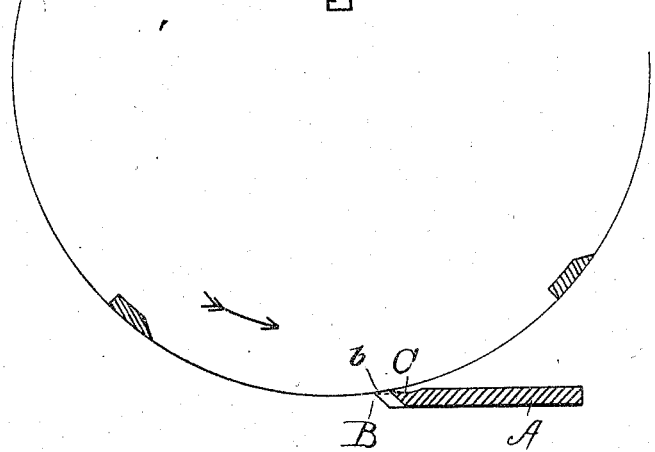

In the drawings, Figure 1 is a perspective view of one of my improved cutter-bars, and Fig. 2 is a transverse section thereof, the curve shown denoting the arc of rotation of the rotary blades.

The cutter-bar A is a flat steel bar extending from end to end of the head of the mower and is to be bolted firmly in position to coact with the blades of the revolving cutter, which rotate in close proximity to it or slightly touching it.

B B are the teeth at the front edge of the cutter-bar, formed by milling out obliquely the intervening metal, so as to leave a succession of teeth having sharp cutting-edges where the oblique serrations intersect the flat upper surface of the steel bar A. Each tooth also has its upper surface beveled downwardly and forwardly, as shown at *b*, so that when in position its said surface will lie close to and substantially parallel with the arc of rotation of the edges of the rotary cutters, thus securing accurate coaction between the said rotary cutters and the cutting-edges of the teeth.

C represents a longitudinal groove, formed in the upper surface of the bar A and extending from end to end thereof behind and adjacent to the series of teeth, to reduce friction of the rotary blades or foreign matter upon the bar behind the teeth and to facilitate grinding the stationary cutter by the removal of a portion of the metal from the bar adjoining the surface to be ground. Each tooth is shown slightly recessed in its upper surface adjacent to said groove, as at D, for the same purpose.

In operation the blades of grass are forced by the forward motion of the machine and the action of the rotary cutters between the teeth of the fixed cutter-bar, where they are held from lateral displacement while being severed by said rotary cutters in conjunction with the sharpened edges of said teeth.

The advantage of the beveled edge on my cutter-bar consists in the fact that it admits of the bar being set far enough forward to cause the teeth to properly engage the blades of grass near their roots and hold them on the proper cutting-line until sheared off, while at the same time it is not necessary to set the bar so far forward as to increase friction of the bar on the turf, and consequently increase the power required to run the machine. The ordinary plain bar, or a toothed bar which is not beveled, must be set so far forward to secure proper action of the cutting-edges that friction on the turf is greatly increased. If it is sought to avoid such undue friction in the case of a toothed bar not beveled, the bar has to be set so far back and also so tilted up to secure the proper shearing action of the edges that the teeth will not engage the blades of grass properly, if at all. The absence of such bevel is one of the numerous causes which have rendered serrated cutter-bars heretofore constructed inefficient and useless. My bar is set so as to be about horizontal from front to rear line when in working position, and the upper longitudinal line of the beveled edge intersects the arc of rotation of the rotary cutters at an angle of about twenty degrees backward from a perpendicular let fall from the axis of rotation of said cutters. This location and adjustment of a cutter-bar constructed as herein described secures thorough and absolutely reliable action of the cutting-edges with close shearing of the lawn and at the same time a lightness and ease of running never before attained in machines of this class.

I claim as my invention—

1. A stationary cutter-bar for lawn-mowers consisting of a flat steel bar serrated on its front edge by alternate teeth and notches extending obliquely backward from the upper to the lower surface of such edge, and formed with a longitudinal groove or recess in its upper surface adjacent to the bases of said teeth, substantially as set forth.

2. A stationary cutter-bar for lawn-mowers, consisting of a flat steel bar serrated on its front edge by alternate teeth and notches extending obliquely backward from the upper to the lower surface of such edge, the upper surfaces of such teeth being beveled outwardly and downwardly paralleled with the arc of rotation of the rotary cutters, substantially as set forth.

3. A stationary cutter-bar for lawn-mowers, consisting of a flat steel bar serrated on its front edge by alternate teeth and notches extending obliquely backward from the upper to the lower surface of such edge, the upper faces of such teeth being beveled outwardly and downwardly parallel with the path of rotation of the rotary cutters, and the upper surface of said bar having a longitudinal groove or recess formed therein adjacent to the bases of said teeth, substantially as set forth.

4. A stationary cutter-bar for lawn-mowers, consisting of a flat steel bar serrated on its front edge by alternate teeth and notches extending obliquely backward from the upper to the lower surface of such edge, the upper faces of such teeth being beveled outwardly and downwardly parallel with the path of rotation of the rotary cutters, the upper surface of said bar containing a longitudinal groove adjacent to the bases of said teeth, and the upper faces of said teeth having recesses or excavations formed therein adjacent to an opening into said groove, substantially as set forth.

In testimony whereof I have signed my name to this specification, in the presence of two subscribing witnesses, on this 3d day of October, A. D. 1892.

WILLIAM C. ALLEN.

Witnesses:
CLIFFORD HEWITT,
C. LEAVENS ELDREDGE.